United States Patent
Beck et al.

(10) Patent No.: US 9,970,740 B2
(45) Date of Patent: May 15, 2018

(54) VISCOUS LIQUID MONOPROPELLANT

(75) Inventors: Peter Joseph Beck, Auckland (NZ); Adam Michael Berry, Auckland (NZ)

(73) Assignee: Rocket Lab USA, Inc., Wilmington, New Castle, DE (US)

( * ) Notice: Subject to any disclaimer, the term of this patent is extended or adjusted under 35 U.S.C. 154(b) by 40 days.

(21) Appl. No.: 13/419,810

(22) Filed: Mar. 14, 2012

(65) Prior Publication Data

US 2012/0234196 A1    Sep. 20, 2012

Related U.S. Application Data (60) Provisional application No. 61/452,559, filed on Mar. 14, 2011.

(51) Int. Cl.
| | |
|---|---|
| C06B 47/00 | (2006.01) |
| F42B 15/12 | (2006.01) |
| F41A 1/04 | (2006.01) |
| B64G 1/40 | (2006.01) |
| F02K 9/42 | (2006.01) |
| F02K 9/72 | (2006.01) |

(52) U.S. Cl.
CPC ............. *F42B 15/12* (2013.01); *B64G 1/401* (2013.01); *C06B 47/00* (2013.01); *F41A 1/04* (2013.01); *F02K 9/42* (2013.01); *F02K 9/72* (2013.01)

(58) Field of Classification Search
CPC ....................................................... C06B 45/00
See application file for complete search history.

(56) References Cited

U.S. PATENT DOCUMENTS

| | | | | |
|---|---|---|---|---|
| 3,113,894 A | * | 12/1963 | Burton | C06B 45/00 |
| | | | | 149/113 |
| 3,407,100 A | * | 10/1968 | Scurlock et al. | 149/19.4 |
| 3,662,802 A | * | 5/1972 | Bedell | 149/36 |
| 3,925,124 A | | 12/1975 | Tannenbaum | |
| 5,823,478 A | * | 10/1998 | Dunn | 244/171.1 |
| 2010/0206441 A1 | * | 8/2010 | Baran et al. | 149/1 |

* cited by examiner

*Primary Examiner* — Aileen B Felton
(74) *Attorney, Agent, or Firm* — Wolf, Greenfield & Sacks, P.C.

(57) ABSTRACT

This invention relates to the construction of a rocket motor and fuel system thereof and, in particular to a new and useful Viscous Liquid Monopropellant (VLM) rocket motor containing a liquid propellant that is pumped into the combustion chamber, atomized and then ignited. The atomization step significantly increases the surface area of the propellant, delivering faster burn rates and smoother combustion. VLM is a non-Newtonian fluid containing both oxidizers and fuels. These monopropellants are comprised of a variety of liquid and solid components, mixed together to form a homogenous fluid, although heterogeneous in composition. The solid constituents are retained within the liquid phase by dispersion, suspension, bonding or chemical emulsification techniques, so as when a motive force is applied to the propellant, all the constituents are also transported, and held in correct proportion while doing so.

18 Claims, 4 Drawing Sheets

VISCOUS LIQUID MONOPROPELLANT

CROSS REFERENCE TO RELATED APPLICATION

This application claims the benefit of U.S. Provisional Application No. 61/452,559, filed Mar. 14, 2011, the entire disclosure of which is incorporated herein by reference.

FIELD OF THE INVENTION

The invention relates to propellants used in devices requiring rapid gas generation and in particular to a Viscous Liquid Monopropellant (VLM) and/or to a rocket motor and fuel system utilising the VLM.

BACKGROUND TO THE INVENTION

Chemical propellants are used extensively for rocket propulsion and gas generating systems. Traditionally solid and liquid chemical rocket propellants have been the primary means of powering rockets and missiles.

Typical rocket propellants are comprised of oxidiser(s) and fuel(s) in varying proportions to provide the required characteristics for a particular application.

In solid propellants, the fuel and oxidiser are stored in the same vessel with a portion of the fuel often acting as the means to bind its constituents together into a solid mass. This component is known as a binder fuel and typically comprises 10-20% of the mass. Binder-fuels traditionally used in solid propellant formulation are based on polybutadiene chemistry, with recent developments leading to binder-fuels based on glycidyl azide polymers. Other fuel binders include nitrocellulose plasticised with nitroglycerine, known as double based propellants.

Solid rocket propellants will often contain other additives including; thermic agents, high energy additives, bonding agents, curing catalysts or inhibitors, surfactants/emulsifiers and antioxidants. These additives are typically in the form of solids (usually fine powders), and/or non-volatile liquids which can be mixed together and then either (a) extruded or (b) undergo a chemical reaction to form the desired geometry of the final product (known as a grain.)

The chemistry of liquid propellants, by comparison is generally much simpler than solid propellants, often comprising of only one or two components. Hydrazine, liquid oxygen+liquid hydrogen (LOx-LH$_2$) and liquid oxygen+kerosene (LOx/JP-1) are typical examples of this type of propellant. Liquid Propellants have their oxidiser(s) and fuel(s) stored in separate reservoirs which are intimately mixed with each other just prior to ignition. On a weight for weight basis, liquid fuels are significantly more powerful than their solid fuel counterparts.

Both traditional solid and liquid propellants have serious drawbacks which in some contexts prevent or seriously hamper their use.

With time, solid propellants will degrade via chemical and/or mechanical means which can lead to their failure during deployment, often with catastrophic consequences. Another drawback of solid rocket propellants is that the power output is predetermined by the geometry of the grain, and once ignited, they are not easily or reliably shut down or restarted if shutdown was successful. Solid propellants are often sensitive to heat, light, friction, and shock, and may ignite or explode unexpectedly if subjected to these conditions either at the time, or subsequently when attempted to be fired.

Liquid fuelled propellants suffer from three major drawbacks. Unlike solid propellants, at least one component of liquid propellants is a cryogenic liquid, requiring filling at a site shortly before use. In addition, expensive and heavy injection systems are required to homogeneously mix multiple liquid components just prior to combustion in a consistent, reproducible manner. Liquid propellants suffer from a very low density resulting in the need for large volume tanks being required to hold a relatively small mass of propellant.

As the name suggests, hybrid propellant systems were developed as a combination of the two systems. Like liquid fuelled rockets, hybrid systems have their fuel and oxidiser stored in separate compartments, however they exist in separate states of matter which are combined in the combustion chamber just prior to ignition. They are mechanically simpler and use denser fuels than liquid systems, and can be throttled, shut down and can potentially be restarted.

Even in view of the forgoing, hybrid propellant systems are far from ideal. The densities are still significantly less than solid propellants, and the system usually requires complex engineering to ensure the oxidiser:fuel ratio stays constant during propellant burn.

In summary, conventional solid & liquid propellant systems have considerable drawbacks. Solid propellants have little flexibility in operational output while liquid propellants have launch readiness and design drawbacks. Current alternative approaches, such as hybrid propellant systems, have not been able to completely remedy the problems associated with the earlier technologies.

It is an object of the present invention to provide an alternative form of propellant and, in particular, a viscous liquid monopropellant that overcomes at least some of the limitations of the abovementioned propellants, or which at least provides the public with a useful choice.

SUMMARY OF THE INVENTION

In a first aspect the invention may broadly be said to consist of a viscous liquid monopropellant (VLM) comprising:
 a) a liquid carrier-fluid present in an amount ranging from about 5% to 80% by mass, and
 b) a solid fraction ranging from about 20% to 95% by mass dispersed, suspended or emulsified in the carrier fluid.

The carrier-fluid may comprise one liquid carrier or a combination of liquid carriers.

Preferably the carrier-fluid is present in an amount ranging from about 15% to 65% by mass. More preferably the carrier-fluid is present in an amount ranging from 20% to 40% by mass.

Preferably the solid fraction is present in an amount ranging from 35% to 85% by mass. More preferably the solid fraction is present in an amount ranging from 60% to 80%.

Preferably the carrier-fluid comprises at least one fuel component and the solid fraction comprises one or more primary oxidiser(s). The solid fraction may also comprise one or more fuel components.

Preferably the VLM further comprises any combination of:
 a) a high-energy oxidiser additive(s) or substitute or combination thereof present in an amount ranging from less than 1% to about 90% by mass, b) a thermic agent or combination of thermic agents present in an amount ranging from less than 1% to about 25% by mass,
c) a surfactant or combination of surfactants present in an amount ranging from less than 1% to about 20% by mass,
d) a bonding agent or combination of bonding agents present in an amount ranging from less than 1% to about 10% by mass,
e) a rheology modifier or combination of rheology modifiers present in an amount ranging from less than 1% to about 10% by mass,
f) a burn rate modifier or combination of burn rate modifiers present in an amount ranging from less than 1% to about 10% by mass, and
g) a dissolved gas or gases, to aid dispersion and combustion, in an amount ranging from less than 1% to about 25% by mass.

Preferably the carrier-fluid has a surface tension below approximately 30 dynes/cm and a viscosity from about 50 to 5000 centistokes at standard temperature and pressure (STP).

The carrier-fluid may be organic or inorganic or a combination thereof.

The carrier-fluid may act as an oxidiser or as a fuel or both.

Preferably the carrier-fluid includes any one or more of silicone fluids, paraffin oils or synthetic oils, such as polyalphaolefins and perfluorinated liquids.

Preferably the VLM is a thixatropic fluid.

Preferably the solids fraction comprises the primary oxidant component(s).

Preferably the primary oxidant component(s) is/are selected from oxidisers including ammonium perchlorate, ammonium nitrate, hydroxylamine nitrate, ammonium dinitramide, hydrazinium nitroformate and hydrogen peroxide.

Preferably the high energy additive or oxidant substitute component(s) have the following general formulae (either):

Where R is a moiety selected from a single example or a combination of $C_1$ to $C_{20}$ alkyl, branched alkyl, cycloalkyl, hydroxyl, alkoxy, alkylamine, alkylhalide; carbonyl in ketones, esters, and/or amides; nitro, nitrate ester, nitramide, azo, azide, aryl, substituted aryl, and/or heterocylic ring systems and any salts of the aforementioned.

Preferably the thermic agent(s) is/are selected from metals including aluminium, magnesium, boron, beryllium, silicon, zirconium, and alloys of these, either alone or in combination.

Preferably the surfactant(s) is/are selected from agents including polysorbates such as Polyoxyethylene (20) sorbitan monooleate, alkylphenylethoxylates, alcohol ethoxylates, soya lecithin or derivatives thereof, solutions of polycarboxylic acid salts of polyamine amides, acidic polyesters or polyethylene glycols (PEGs) of molecular weight no more than 5,000 g/mol$^{-1}$.

Preferably the bonding agent(s) is/are selected from agents including [3,5-bis(2-ethylaziridine-1-carbonyl)phenyl]-(2-ethylaziridin-1-yl) methanone, 1,1-Isophthaloyl bis (2-methylaziridine), amodimethicone, vinyl ether derivatives, and amine-substituted alkanes, alcohols, polyoxyethylenes or polyoxypropylenes of molecular weight no more than 5,000 g/mol$^{-1}$.

Preferably the rheology modifier(s) is/are selected from agents including castor oil derivatives, organoclay derivatives, modified urea and fumed silica.

Preferably the burn rate modifier(s) is/are selected from agents including iron (III) oxide ($Fe_2O_3$), copper(II) chromite ($2CuO.Cr_2O_3$), cupric oxide (CuO), chromium (III) oxide ($Cr_2O_3$), vanadium (V) pentoxide ($V_2O_5$), and organometallic transition metal coordination complexes such as ferrocene and other cyclopentadienyl or other isoelectronic (cf. cyclopentadienyl) ring system complexes, the cyclopentadienyl or other rings as described being substituted or not, symmetrical or non-symmetrical.

Preferably the dissolved gas is used for means of fluid dispersal, atomisation and combustion enhancement.

Preferably the dissolved gas is dinitrogen monoxide (nitrous oxide).

The second aspect of this invention relates to the particular physiochemical properties of both the liquid and solid fractions required to achieve constant reproducible power. In the preferred embodiment, the propellant is a thixatropic fluid with a low surface tension which provides optimal properties during storage, pumping, atomisation and combustion.

In one embodiment, the VLM comprises a 70% solids fraction consisting of 20 micron spherical aluminium and 200 micron spherical ammonium perchlorate. This embodiment also contains a liquid fraction consisting of 28.4% polydimethicone and 1% amodimethicone.

In the third aspect, the invention may be broadly said to consist of a rocket propulsion system utilising the VLM propellant for the purposes of providing thrust and/or attitude control to vehicles and comprising:
a) a propellant tank for containing VLM propellant,
b) a propellant feed system for transporting the VLM propellant from the tank at suitable pressures and flow rates,
c) a combustion chamber for receiving the propellant from the tank and burning it to generate combustion by-products,
d) an injector system at one end of the combustion chamber for injecting the propellant into the combustion chamber,
e) an ignition system to initiate the combustion of propellant within the combustion chamber, and
f) a nozzle at another end of the combustion chamber for the acceleration and exit of the combustion by-products thereby providing thrust.

One of the central principles of a VLM motor is that the rate of combustion of the propellant must be slower than the rate that it is introduced into the combustion chamber. To ensure this, the pressure of the plenum must be greater than the pressures generated in the combustion chamber, if not blowback may occur, resulting in catastrophic failure.

Preferably the propellant tank is sealed. Preferably the propellant feed system incorporates a valve to regulate the flow of propellant out of the tank.

Preferably the propellant feed system utilises pressurised gas acting on the propellant to transport the propellant to the combustion chamber. Preferably, the pressurised gas acts to transport the propellant to the combustion chamber using either an expanding bladder or a movable piston. This pressurised gas may be provided from a dedicated reservoir or from a gas generator motor. Combustion by-products from the primary combustion chamber may also be used to contribute towards the required pressurised gas.

Alternatively the propellant feed system uses a movable piston driven by mechanical means such as linear motors, pneumatic/hydraulic rams, screws or other suitable mechanisms in order to transport the propellant to the combustion chamber. In yet another alternative, the propellant feed system utilises mechanical pumps, including but not limited to turbopumps, to transport the propellant to the combustion chamber.

Preferably the combustion chamber incorporates an ablative insulation liner on the inside of the combustion chamber for thermal management. Alternatively or in addition, a liquid coolant is provided surrounding the chamber walls. Preferably the injector system is designed such that the VLM propellant stream can be broken up and atomised into small droplets. Preferably the nozzle is of the convergent-divergent (de Laval) type. Preferably the ignition system is capable of operating multiple times, thereby providing the ability to restart the propulsion system multiple times.

In one embodiment a sub-orbital airborne missile utilising the propulsion system comprises:
  a) a body for housing the propulsion system, and
  b) a control system for controlling the operation of the propulsion system.

Preferably the control system comprises one or more thrust chambers spaced around the body for controlling the trajectory/attitude of the missile. Preferably the thrust chambers utilise the VLM propellant out of the same tank as the propulsion system.

In a second embodiment an orbital launch vehicle utilising the propulsion system comprises a body having two or more stages separable during flight, and wherein one or more of the stages utilise the propulsion system for primary thrust.

In a third embodiment a spacecraft utilising the propulsion system comprises:
  a) a body coupled to the propulsion system, and wherein the propulsion system comprises of one or more thrust chambers radially spaced around the body for attitude control/manoeuvring of the spacecraft, and
  b) a control system for controlling the operation of the above-mentioned propulsion system.

Preferably each thrust chamber is associated with separate feed and ignition systems and all thrust chambers are associated with the same propellant tank.

In a fourth aspect the invention may broadly be said to consist of a method of forming a VLM comprising the step of dispersing, suspending, bonding or emulsifying a solid fraction in a carrier-fluid wherein the carrier-fluid is present in an amount ranging from about 5% to 80% by mass, and the solid fraction is present in an amount ranging from about 20% to 95% by mass.

The term "carrier-fluid" as used in this specification and claims means the base fluid of the VLM mixture used to carry the components of the mixture and can consist any one or more constituents in the liquid phase (liquid carriers) combined to form the carrier-fluid.

The phrase "solid fraction" as used in this specification and claims means the one or more constituents of the VLM mixture that are in the solid phase.

The phrase "liquid fraction" as used in this specification and claims means the one or more constituents of the VLM mixture that are in the liquid phase.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers/percentages disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

BRIEF DESCRIPTION OF THE DRAWINGS

Preferred embodiments of the invention will be described by way of example only and with reference to the drawings, in which.

DETAILED DESCRIPTION OF THE INVENTION

The invention is directed to the use of liquid multi-component monopropellants as chemical reactive media for application in rocket engines for the means of propulsion or reaction control in rockets or missiles, or alternative rapid gas generation applications.

The invention also relates to the construction of a rocket motor and fuel system thereof and, in particular to a new and useful monopropellant rocket motor containing a liquid propellant that is pumped into the combustion chamber via chemical or mechanical means, atomised and then ignited. The atomisation step significantly increases the surface area of the propellant, therefore improving the efficiency of combustion.

The preferred form VLM is a non-Newtonian fluid containing both oxidisers and fuels. These monopropellants are comprised of a variety of liquid and solid components, mixed together to form a homogenous fluid, although heterogeneous in composition. The solid constituents are retained within the liquid phase by dispersion, suspension, bonding or chemical emulsification techniques, so as when a motive force is applied to the propellant, all the constituents are also transported, and held in correct proportion whilst doing so.

A solid or liquid oxidiser is dispersed in a low surface tension carrier-fluid (optionally along with other additives) with a viscosity between 50 and 50000 centistokes at Standard Temperature and Pressure (STP). The solid phase is dispersed, suspended, bonded or chemically emulsified in the carrier fluid. This propellant is used as required in applications such as in rocket motors where it can be injected into a combustion chamber similar to what is found in traditional liquid propellants, generating high temperature gases which can be accelerated and expelled through a rocket nozzle to produce thrust for propulsion applications (the details of which are known to those skilled in the art) or any other application where controllable and rapid gas generation is required. Only minor modifications to the hardware of liquid fuelled motors are required for conversion to VLM propellants, and provisions for effective, consistent separate oxidiser-fuel mixing required in liquid rockets are superfluous in VLM motors.

The propellants within the scope of the present invention are capable of combustion within a combustion chamber, once introduced from a reservoir through an injector designed to maximise the available surface area for combustion by means of atomisation or other fine dispersal. Once combusted, the gases may, as with other propellants in a manner known to those skilled in the art, be directed out of a rocket nozzle to produce propulsive power, or in any other application which requires rapid, controllable gas generation on demand.

These propellants are comprised of a variety of liquid and solid components, mixed together to form a homogenous fluid, although heterogeneous in composition. Where applicable, the solid constituents are held in suspension, emulsion or dispersion in the liquid, so as when a motive force is applied to the propellant fluid, all the constituents are also transported, and held in correct proportion whilst doing so.

The VLM of the invention comprises a carrier-fluid present in an amount ranging from about 5% to 80% by mass, and a solid fraction present in an amount ranging from about 20% to 95% by mass dispersed, suspended or emulsified in the carrier fluid.

In one embodiment the carrier-fluid is present in an amount ranging from about 15% to 65% by mass and more preferably the carrier-fluid is present in an amount ranging from 20% to 40% by mass.

The solid fraction is preferably present in an amount ranging from 35% to 85% by mass and more preferably the solid fraction is present in an amount ranging from 60% to 80%. It is preferred that the solids fraction is kept above about 60% by mass as experimental results have found that flammable carriers are required to aid ignition when the liquid fraction drops below about this concentration.

Carrier Fluid

The base fluid, a carrier-fluid, is a low surface tension fluid with a surface tension preferably below 30 dynes/cm at STP and a viscosity preferably between 50 and 50000 centistokes and very preferably between 100 and 5000 centistokes at STP which is combusted by oxidants in the propellant. The surface tension and viscosity may be modified with surfactants and/or rheology modifiers by those skilled in the art to achieve the desired characteristics. The low surface tension of the carrier fluid may also be attained in a carrier fluid with a surface tension above 30 dynes/cm at STP when modified with surfactant(s).

Experimental results have found that it is difficult to achieve a pumpable fluid with high solids loadings unless these parameters are met. The low surface tension also acts to eliminate any foam generated during production and improves atomisation. A high shear viscosity is dependent on the propellant formulation but preferably needs to be between 100 cSt and 1000 cSt at 10000 s$^{-1}$ at STP to avoid the carrier being eluted from the propellant during pumping.

The carrier-fluid may be organic or inorganic in nature or combinations thereof and may act as an oxidiser and/or a fuel. The carrier-fluid may comprise one liquid carrier fluid component or a combination of liquid carriers. The carrier-fluid may be organic or inorganic in nature or combinations thereof. It is preferred that the surface tension of all the liquid carrier constituents when combined is below approximately 30 dynes/cm and the viscosity of all liquid carrier constituents when combined is from about 50 centistokes to 50000 centistokes at STP.

The carrier fluid may include, but is not limited, any one or more of the following liquid carrier constituents: silicone fluids, paraffin oils, polyalphaolefins and perfluorinated liquids.

Examples of suitable carrier fluids/liquid carriers can be found in the table below:

The use of carrier fluids that contain oxidising functionality either along the backbone or in pendant groups, such as, but limited to; ethers, nitro, azo, carbonyl or halogens are preferred to reduce the solids fraction of the propellant. This decreases the chance of elution of the liquid from the propellant during storage and pumping.

It is preferred that the carrier fluid is not the primary oxidiser.

To improve the long term stability of the primary oxidant as well as aiding ignition, it is preferred that less than 5% water can dissolve into the carrier fluid.

When utilised in terrestrial environments, it is preferable for carrier fluids to have a freezing point below −10° C. and boiling points above 80° C., as well as low vapour pressure to reduce operational and engineering constraints.

Primary Oxidants

The primary oxidant(s) or oxidising agent(s) can be any substance or combination of substances that liberate oxygen for the combustion of the fuel.

The primary oxidant component(s) can be selected from oxidisers including but not limited to ammonium perchlorate, ammonium nitrate, hydroxylamine nitrate, ammonium dinitramide hydrazinium nitroformate and hydrogen peroxide. Preferably, these oxidisers provide the primary oxidative capacity, but may be partially or completely substituted with high energy additives.

Crystalline re-arrangement with temperature fluctuations will not degrade the VLM. As a result, phase stabilisation of an oxidiser such as, but not limited to, ammonium nitrate is not necessary.

High Energy Additives or Oxidant Substitutes

Nitromethane, nitroethane, other nitroalkanes and nitroalkenes, and well-known high-energy additives such as RDX or HMX can be used as a partial or complete replacement of the aforementioned carrier fluid or oxidant component depending on the state of matter and rheological properties, for purposes including but not limited to the modification of burn-rate, propulsion performance (namely, specific impulse; $I_{SP}$), gas generation, density improvement, reduced heat signature and improvements to the rheology profile.

When using liquid oxidant substitutes such as nitromethane or nitroethane care must taken in selecting a carrier fluid(s) with the same solubility parameters otherwise phase separation may occur. When using these additive(s), parameters such as low water solubility of the carrier fluid may need to be sacrificed to ensure good compatibility.

The high energy additive or substitute component(s) may have the following general formulae (either one of):

where R is a moiety selected from a single example or a combination of $C_1$ to $C_{20}$ alkyl, branched alkyl, cycloalkyl, hydroxyl, alkoxy, alkylamine, alkylhalide; carbonyl in ketones, esters, and/or amides; nitro, nitrate ester, nitramide, azo, azide, aryl, substituted aryl, and/or heterocylic ring and any salts of these.

In addition, R includes coordination complexes with coordination ligands formed from the aforementioned range of compounds, and salts of these. Preferably, the total number of carbons is limited to 20. The R chain may be unsaturated at various points along alkyl branched or non-branched chains, as with the binder-fuel component(s).

In the case where a high energy substitute/additive can act as a partial or full replacement of the carrier fluid or oxidant, the VLM of the invention can broadly be described to consist of mixture comprising any combination of two or more of:
- (a). a solid or liquid primary oxidant or combination of oxidants in an amount ranging from about 5% to 90% by weight, or
- (b). a liquid binder-fuel or combination of binder-fuels present in an amount ranging from about 5% to 50% by weight, or
- (c). a high-energy oxidiser additive or substitute or combination thereof present in an amount ranging from about 5% to 90% by weight.

Surfactants

Surface active agents (surfactants) are compounds that lower the surface tension of a liquid, the interfacial tension between two liquids, or that between a liquid and a solid. The use of surfactants in VLM can reduce the viscosity, improve atomisation and eliminate agglomeration and/or phase separation.

The surfactant(s) is/are selected from agents including but not limited to polysorbates (polyethoxylated sorbitans) such as [3,5-bis(2-ethylaziridine-1-carbonyl)phenyl]-(2-ethylaziridin-1-yl) methanone (Tween 80), alkylphenol ethoxylates such as Triton X 100, alcohol ethoxylates such as Teric 12A23, soya lecithin or derivatives thereof such as Colorol E, solutions of polycarboxylic acid salts of polyamine amides such as Antiterra 204, acidic polyesters such as Antiterra U or polyethylene glycols (PEGs) of molecular weight no more than 5,000 $g/mol^{-1}$.

Thermic Agents

Thermic agents in the form of powdered metals including but not limited to aluminium, magnesium, boron, beryllium, silicon, zirconium, and alloys thereof can be utilised in VLM propellants, either alone or in combination, for the purposes of acting as a means to increase the thermal output, providing additional combustion heat for the improvement of propulsion performance ($I_{SP}$) and increase in composition density.

Bonding Agents

Bonding agents can be used to improve the compatibility of major substituents. Two requirements make a good bonding agent for VLM; firstly it must be a weaker base than the neutralised cation of any salts present, and secondly; it must contain functional groups that are compatible with the carrier fluid. The use of bonding agents is especially preferred when salts are dispersed into low polar or non polar fluids.

The bonding agent(s) is/are selected from agents including but not limited to triethanolamine, triethylamine, methanones such as [3,5-bis(2-ethylaziridine-1-carbonyl)phenyl]-(2-ethylaziridin-1-yl) methanone, acyl aziridines such as 1,1-Isophthaloyl bis(2-methylaziridine), vinyl ether derivatives, amodimethicones and amine-substituted polyoxyethylenes or polyoxypropylenes of molecular weight no more than 5,000 $g/mol^{-1}$.

Rheology Modifiers

Rheology modifiers can be split into two broad classes; associative and non associative. As the name suggests, associative thickeners interact with other constituents in the fluid to produce a three-dimensional network, whilst non associative thickeners work by either swelling or by absorbing high volumes of fluid, leading to partial or complete flocculation of the system. Both families of rheology modifiers can produce thixatropic or pseudoplastic fluids, which is preferred in VLM fluids as these profiles have minimal effect on pumping and atomisation but reduce or eliminate settling during storage.

The rheology modifier(s) is/are selected from agents including but not limited to castor oil or derivatives thereof, polyamide or derivatives thereof, bentonites and other organoclays, modified urea and fumed silica.

Dissolved Gas

Depending on the composition of the carrier fluid, gases can be incorporated into VLM. There are a number of advantages in doing this including; acceleration of burn-rate, improved atomisation of the solids and liquids, improved propulsion performance ($I_{SP}$), and decreased solids fraction.

When exposed to an appropriate increase in temperature and/or decrease in pressure, fluids with high vapour pressures will boil, which greatly increases the available surface area for combustion. This results in increased combustion efficiencies, simplified injector design and reduces the residence time. The use of oxidising gases dissolved in the monopropellant is especially favourable in formulations that contain a carrier fluid low in oxygen, nitrogen or halogen groups. An example of a preferred gas is dinitrogen monoxide (nitrous oxide.)

Burn-Rate Modifiers

VLM propellants can include burn-rate modifier(s) which accelerate or stabilise the combustion of propellants. Burn rate modifiers such as transition metal oxides or organometallic complexes are well known for altering the ballistic properties in solid rocket propellants and can be readily used in VLM. This can result in increased combustion efficiency and hence performance.

The burn rate modifier(s) is/are selected from agents including but not limited to iron (III) oxide ($Fe_2O_3$), copper (II) chromite ($2CuO.Cr_2O_3$), cupric oxide (CuO), chromium (III) oxide ($Cr_2O_3$), vanadium (V) pentoxide ($V_2O_5$), and organometallic transition metal coordination complexes such as ferrocene and other cyclopentadienyl based chemistries, or other rings as described being substituted or not, symmetrical or non-symmetrical.

Embodiment of the VLM Formulation—Example

An embodiment of this concept was prepared for use in a VLM rocket motor. The formulation was comprised of the following constituents, and was mixed in the following order:

| Addition Order | Compound/ingredient | Proportion (%) |
| --- | --- | --- |
| 1 | Polydimethylsiloxane (Carrier-fluid) | 28.4% |
| 2 | Castor Oil Derivative (thickener) | 0.6% |
| 3 | Amidomethicone (Bonding Agent) | 1% |
| 4 | Aluminium powder, spherical, 20 µm (Thermic Agent) | 10% |
| 5 | Ammonium perchlorate, spherical, 200 µm (Oxidant) | 60.0% |

Figure 1:
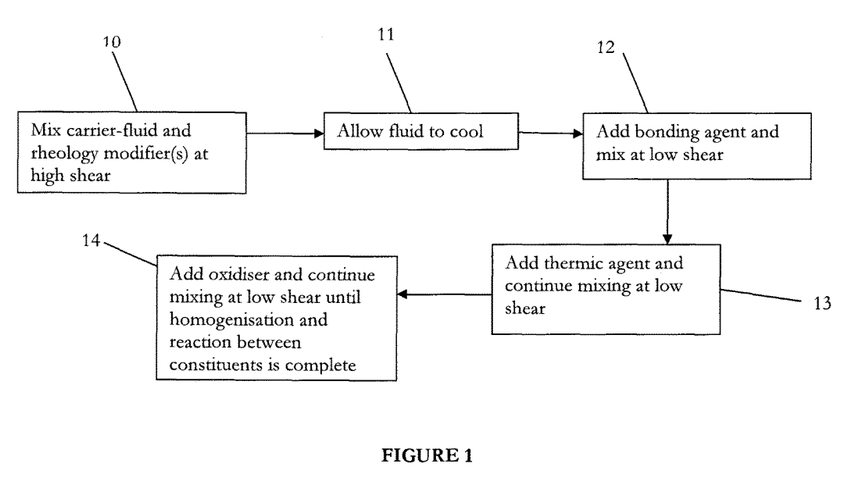
FIG. 1 is a flow-diagram showing the steps of forming the preferred form VLM mixture of the invention.

The liquid fraction comprises Polydimethylsiloxane (carrier-fluid), castor oil derivative (rheology modifier) and amidomethicone (bonding agent). The solid fraction comprises aluminium powder (thermic agent) and ammonium perchlorate (oxidiser). Mix times vary accordingly to batch size; however, in the above example and for a batch size of 100 grams, (and referring to FIG. 1) components 1 and 2 were mixed at high shear in a high speed dissolver for 15 minutes at 80° C. (step 10). The fluid was then allowed to cool to ambient temperature (step 11). Component 3 was then added and mixed for 2 minutes at low shear (step 12) before the addition of component 4. The mix was then left for 5 minutes at low shear (step 13) before component 5 was added. The propellant was then left to mix for a further 20 minutes at low shear to insure good homogenisation and a complete reaction of the Amidomethicone bonding agent with the ammonium ion on surface of the oxidiser (step 14).

Applications

Rocket propulsion methods and systems utilising chemical propellants are used in a range of civil and military applications including missiles, launch vehicles, satellites and other spacecraft. These systems are used in a number of roles including the provision of primary propulsive thrust, attitude-control and station-keeping duties.

The invention benefits from the characteristics of the VLM propellant and provides an improved propulsion system with a number of advantages over conventional chemical rocket propulsion methods:

- The propellant is pre-combined under controlled manufacturing conditions, so proportions will remain nominal
- Non-cryogenic and stable to store when mixed
- High density, resulting in reduced storage volume
- Can be pre-tanked and ready for launch, like existing solid rocket motors
- Alternatively, can be tanked on the pad if required
- Thrust level or gas generation rate can be varied
- The engine can be shutdown and restarted
- VLM propellants can be formulated to exhibit lower shock sensitivity than traditional composite solid propellants, thereby simplifying the design of feed systems such as injectors, valves, etc., and also improving safety for operators and whilst in storage
- Salts that have a number of crystalline geometries with large variations in density, such as but not limited to ammonium nitrate, do not need to be phase stabilised The VLM propellant can also be produced using existing solid propellant manufacturing infrastructure, and the systems that it can be used in are readily adaptable from existing examples of liquid fuelled designs.

The following is a description of various applications in which the VLM of the present invention can be used in. Other applications requiring rapid gas generation may also utilise the VLM propellant of the invention.

Rocket Motor Utilising VLM Propellant

Figure 2A:
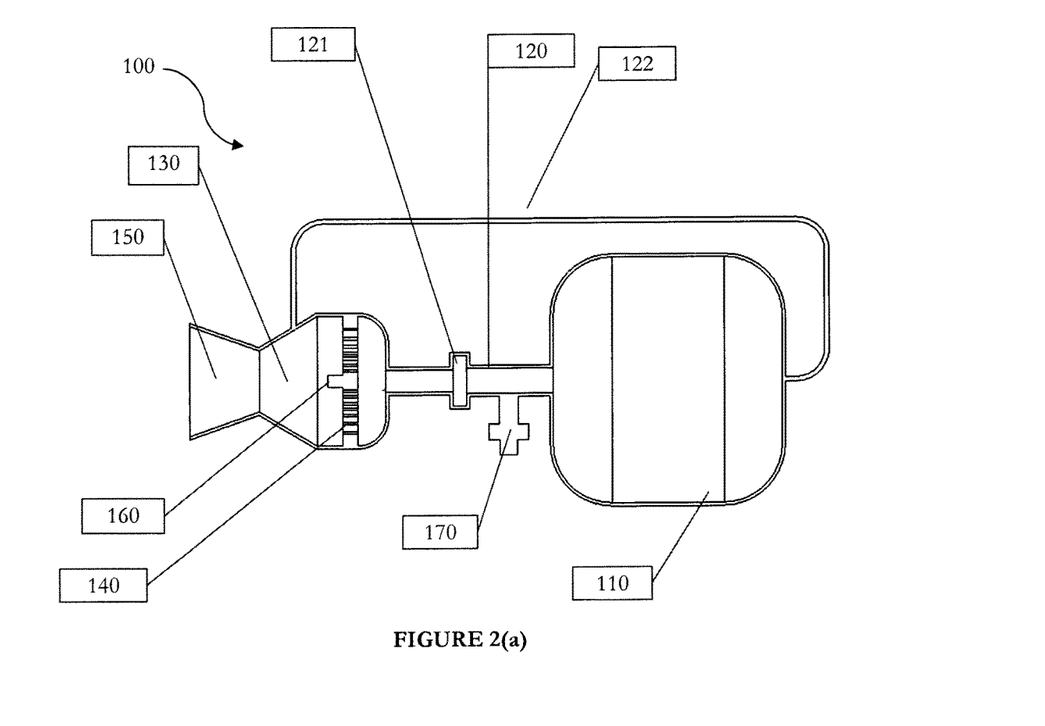
FIG. 2a is a cross-section of a propulsion unit for utilizing the VLM of the invention.
Figure 2B:
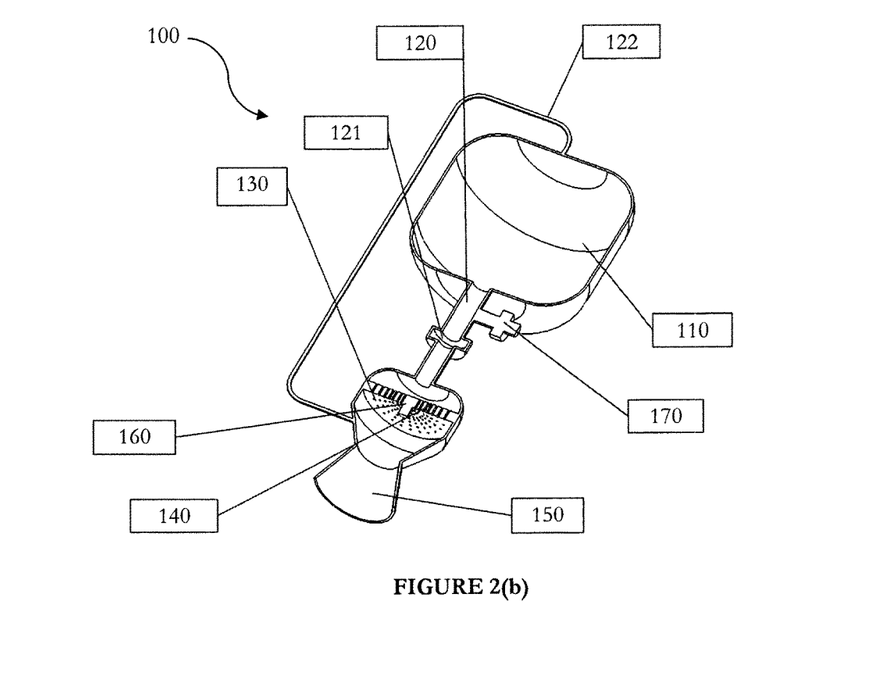
FIG. 2b is a perspective cutaway view of the propulsion unit of FIG. 2a, FIG. 3 is a perspective cutaway view of a missile for utilizing the propulsion unit of FIGS. 2a and 2b.

Referring to FIGS. 2(a) and 2(b), a rocket propulsion system 100 for the purposes of providing thrust to vehicles such as missiles, orbital and sub-orbital launch vehicles, satellites and other spacecraft is shown. The propulsion system comprises a suitable propellant tank 110 for containing VLM propellant, a propellant feed system 120 for transporting the VLM propellant from the tank at suitable pressures and flow rates, a combustion chamber 130 where the propellant is burned, a suitable injector system 140 at one end of the above-mentioned combustion chamber for injecting the propellant into the combustion chamber, a suitable nozzle 150 at another end of the combustion chamber for the acceleration and exit of combustion by-products thereby providing thrust, and a suitable ignition system 160 to initiate the combustion of propellant within the combustion chamber.

The propellant tank 110 is sealed, to prevent moisture and other components from contaminating the propellant, thereby allowing long-term storage of the propellant if necessary. The propellant feed system 120 incorporates a valve 121 that can regulate the flow of propellant out of the tank. The propellant feed rate is preferably high enough that it exceeds the burn rate of the propellant. A valve can also be incorporated for allowing throttling of propellant flow, thereby providing a method for varying thrust and/or gas generation rate. Either valve 121 or a separate valve in the feed system 120 can be provided for controlling throttle.

The propellant feed system in one embodiment utilises pressurised gas through line 122 to act on the propellant to transport the propellant to the combustion chamber. The pressurised gas is therefore at a higher pressure than the pressure in the chamber. The pressurised gas 122 may be in some part combustion by-products of suitable propellant. Such combustion by-products may in some part be from the combustion chamber 130 itself. The pressurised gas 122 does not physically contact the VLM propellant but rather via a suitable expanding bladder or movable piston (not shown).

In alternative embodiments the propellant feed system 120 uses a movable piston driven by mechanical means such as linear motors, pneumatic/hydraulic rams, screws or other suitable mechanisms in order to transport the propellant to the combustion chamber.

In yet another alternative embodiment, the propellant feed system utilises mechanical pumps, including but not limited to turbo-pumps, to transport the propellant to the combustion chamber.

The combustion chamber 130 in the preferred embodiment incorporates thermal management to keep structural material temperatures within limits. Such thermal management can include an ablative insulation liner on the inside of the combustion chamber, and/or active cooling methods such as liquid coolant surrounding the chamber walls.

The injector system 140 in the preferred embodiment is designed such that the VLM propellant stream can be broken up and atomised into small droplets, allowing for better circulation and combustion within the chamber. Atomisation of the propellant will push the behaviour of combustion towards that encountered in traditional liquid bi-propellant rocket engines, allowing for smaller combustion chambers. The injector system 140 can also be designed with suitable material, construction and orifice dimensions such that it is able to "quench" the combustion of the propellant so that combustion cannot proceed to propellant held in the tank, thereby creating an inherent level of safety.

The nozzle 150 in the preferred embodiment is of the convergent-divergent (de Laval) type, as typically used in modern rocket engines.

The ignition system 160 is capable of operating multiple times, thereby providing the ability to restart the propulsion system multiple times.

A suitable control system, actuators and valves 170 that allow propellant to be dumped out of the propellant tank for the purposes of safety can also be employed by the propulsion unit as is known in the art.

The above propulsion unit 100 includes preferred design features that are not intended to limit the scope of the invention. Other types of propellant feed systems, combustion chambers and nozzles for example can be used to those described above and the invention is not intended to be limited to such a design. The VLM propellant of the invention provides the ability to design a propulsion unit 100 with a single propellant tank 110 that can store the propellant for long periods and that can benefit from a simplified feed system 130 that does not require complicated mixing or throttling arrangements amongst other benefits. The above is therefore an example of a preferred propulsion unit design that is to be used in conjunction with, and which benefits from the VLM propellant of the invention.

Missile Utilising VLM Propulsion System

Figure 3:
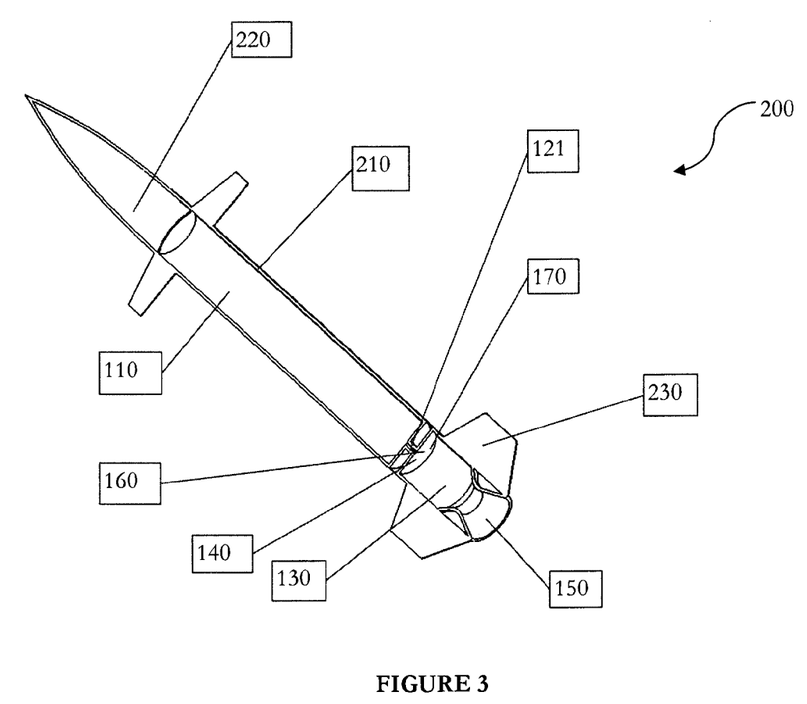

Referring now to FIG. 3, a sub-orbital airborne missile 200 is shown comprising an airframe or main body component 210 for attachment of all other systems on-board the missile 200 and bearing all flight loads, a propulsion system 100 (as in system 100 described above), and a control system 220 for controlling the operation of the propulsion system 100.

The missile 200 offers a number of advantages over missiles using traditional solid or liquid propellant rocket engines:
1. The propellant can be tanked before launch or pre-tanked and stored in the missile, ready to fire
2. VLM propellants offering lower shock-sensitivity than typically-used solid propellants would provide the missile with added robustness to debris impacts, bullets, etc.
3. The ability to dump propellant overboard on-command would improve the safety of a missile, and also offer the ability to lighten a missile in flight.
4. The VLM propellant and propulsion system provides advantages in volumetric efficiency compared to traditional solid rockets used in missile applications. These advantages could provide a combination of: reduced missile volume and therefore drag and weight, and increased missile range due to increased propellant capacity.
5. The VLM propellant and propulsion system provides advantages in mass fraction efficiency compared to liquid rockets used in missile applications due to increased propellant density. These advantages could provide a combination of: reduced missile volume for a given impulse and therefore drag and weight, and/or increased missile range due to increased propellant mass capacity.
6. The missile would be able to shut-down or throttle-down the VLM engine on-command in order to reduce the visibility and heat signature if and when the situation requires it.
7. The missile would be able to shut-down or throttle-down the VLM engine on-command in-order to improve the manoeuvring capability of the missile in high g-force scenarios.
8. The missile would be able to restart and/or throttle-up the VLM engine on-command.

Fins 230 are provided towards the rear of the body for providing aerodynamic stability to the missile 200. Other known methods of aerodynamic stability can be used in alternative embodiments.

The missile 200 also comprises a trajectory/attitude control system 220. This system maybe based upon the movement of flight surfaces such as fins 230 placed on the exterior of the missile airframe 210. The control system 220 may, in conjunction with the above, or alternatively be comprised of a number of small thrust chambers suitably placed and oriented around the vehicle airframe 210. Such a system can utilise the VLM propellant out of the same tank 110 used by the propulsion system 100. The control system 220 comprises of actuators and valves to control the propellant feed system 120 to alter the flow-rate of the propellant, thereby varying the thrust level. The control system 220 therefore also comprises a processor for controlling operation of the above-mentioned valves and actuators. Equipment on board the missile 200 can be included for providing data to the processor of the control system 220 which is used for determining the desired operation of the propulsion system 100. Such equipment can include accelerometers, gyroscopes, barometers, GPS antenna and receivers, telemetry command equipment for remote control by a human operator or computer. Other actuators and/or valves can also be included that enable the shut-down of propellant flow, thereby stopping all thrust.

Launch Vehicle Utilising One or More Stages with VLM Propulsion System

An orbital launch vehicle comprising several stages that are separable during flight (i.e. each "stage" is defined by having a separate propulsion system) can also utilise the propulsion system 100 described above and in particular benefit from the use of the VLM propellant of the invention. In such an embodiment, one or more of the stages of the vehicle can utilise the propulsion system 100 for primary thrust.

The launch vehicle offers a number of advantages over those using traditional solid or liquid propellant rocket engines:
1. Propellant can be tanked before launch or pre-tanked and stored in the launch vehicle, ready to fire.
2. The launch vehicle would be able to shut-down or throttle-down the VLM engine on-command in order to reduce the thrust forces, and thereby reducing the aerodynamic loads and/or accelerations encountered by the launch vehicle
3. The launch vehicle would be able to shut-down and restart the VLM engine on-command in-order to provide for course corrections, correct orbital placement and/or orbit transfers
4. VLM propellants offering lower shock-sensitivity than typically-used solid propellants would provide the launch vehicle with added robustness to debris impacts, bullets, etc.
5. The ability to dump propellant overboard on-command would improve the safety of a launch vehicle.
6. The VLM propellant and propulsion system provides advantages in volumetric efficiency compared to traditional solid and liquid rockets used in launch vehicle applications. These advantages could provide a combination of: reduced volume and therefore drag and weight, and also increased performance due to increased propellant capacity.
7. The VLM propellant and propulsion system provides advantages in mass fraction efficiency compared to liquid rockets used in launch vehicle applications due to increased propellant density. These advantages could provide a combination of: reduced vehicle propellant tank volume for a given impulse and therefore drag and weight, and/or increased range due to increased propellant mass capacity.

One or more of the stages of the launch vehicle can utilise the propulsion system 100 for attitude and trajectory control. A control system associated with these stages can control the operation of the propulsion system 100. The control system comprises actuators and valves to control the propellant feed system 120 to alter the flow-rate of the propellant, thereby varying the thrust level. The control system further comprises a processor for controlling operation of the above-mentioned valves and actuators. Equipment on board the launch system 200 can be included for providing data to the processor of the control system 220 which is used for determining the desired operation of the propulsion system 100. Such equipment can include accelerometers, gyroscopes, barometers, GPS antenna and receivers, telemetry command equipment for remote control by a human operator or computer. Other actuators and/or valves can also be included that enable the shut-down of propellant flow, thereby stopping all thrust. Other actuators and/or valves can also be included that enable the shut-down of propellant flow, thereby stopping all thrust.

Spacecraft Utilising VLM Propulsion System

Figure 4:
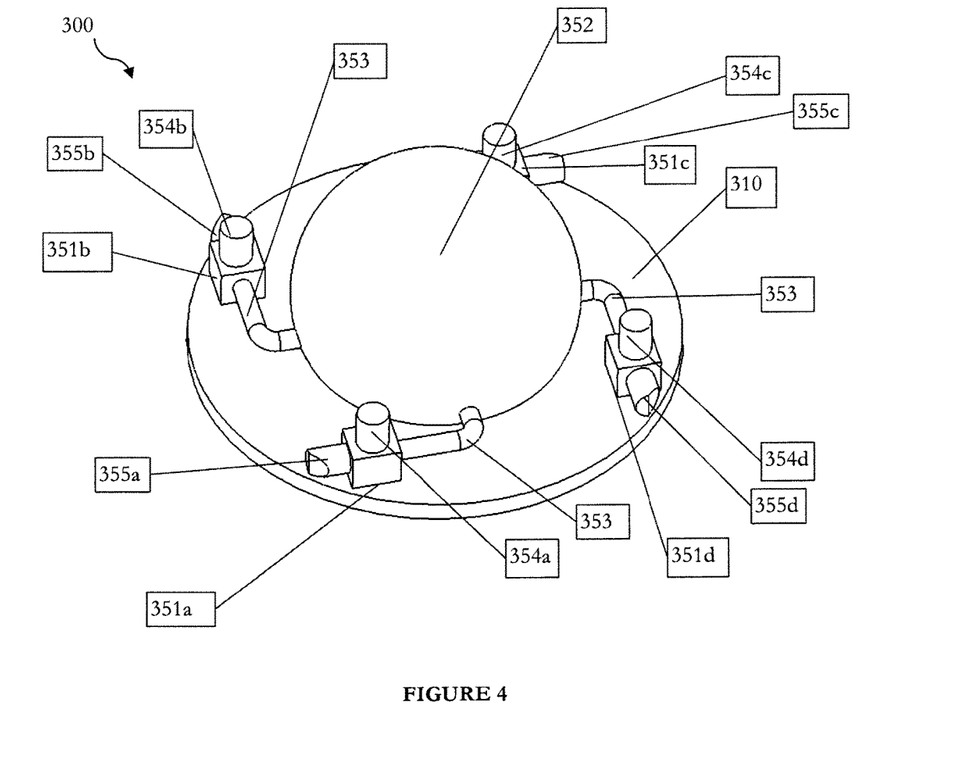
FIG. 4 is a perspective view of a spacecraft utilizing the propulsion unit of FIGS. 2a and 2b.

Referring now to FIG. 4, a spacecraft 300 such as a satellite or interplanetary probe comprises a disc-like body 310, a propulsion system 350 similar to 100 described above with one or more thrust chambers 351a-d coupled to the body 310 for attitude control/manoeuvring of the spacecraft 300 and a control system for controlling the operation of the above-mentioned propulsion system The spacecraft 300 offers a number of advantages over those using traditional solid/liquid or monopropellant systems for use in orbital station-keeping, manoeuvring and attitude control:

1. Propellant can be stored safely in one single tank, and is relatively less toxic and hazardous than traditional propellants used in this application such as Hydrazine.
2. Any number of thrust chambers can utilise propellant stored in a single tank, which is difficult to accomplish using traditional solid composite propellants.
3. The spacecraft would be able to start, throttle and shut-down any number of thrust chambers to provide for attitude control, course corrections, and correct orbital placement and/or orbit transfers.
4. VLM propellants offering lower shock-sensitivity than typically-used solid propellants would provide the spacecraft with added robustness to space debris impacts, asteroids, etc.
5. The ability to dump propellant overboard on-command would improve the safety of a spacecraft, particularly in re-entry scenarios.
6. The VLM propellant and propulsion system 300 provides advantages in volumetric efficiency compared to traditional liquid and gaseous rockets used in spacecraft applications. These advantages could provide a combination of: reduced volume and therefore weight, and also increased performance due to increased propellant capacity.
7. The VLM propellant and propulsion system provides advantages in mass fraction efficiency compared to traditional liquid and gaseous rockets used in spacecraft applications due to increased propellant density. These advantages could provide a combination of: reduced propellant tank volume for a given impulse and therefore weight, and/or increased motive force capacity such as manoeuvring due to increased propellant mass capacity.

The spacecraft 300 comprises a number of small thrust chambers 351a-d radially spaced about the body 310 and suitably oriented for attitude control/manoeuvring of the spacecraft 300. Such a system can utilise VLM propellant out of a single tank 352 as in propulsion system 100 above. Any suitable number of thrust chambers 351 can be utilised by the spacecraft 300. Each thrust chamber 351a-d would comprise an injection system, that effectively atomises the VLM propellant, and a nozzle 355a-d, in order to utilise the exiting combustion products to generate thrust.

The control system comprises actuators and valves to control the propellant feed system 353 to alter the flow-rate of the propellant to each individual thrust chamber 351a-d, thereby varying the thrust level of each chamber 351a-d independently. The control system also comprises a processor for controlling operation of the aforementioned valves and actuators. As in the examples above, equipment on board the spacecraft 300 can be included for providing data to the processor of the control system which is used for determining the desired operation of the propulsion system 350. Such equipment can include accelerometer, gyroscopes, barometers, GPS antenna and receivers, telemetry command equipment for remote control by a human operator or computer. Other actuators and/or valves can also be included that enable the shut-down of propellant flow, thereby stopping all thrust. Other actuators and/or valves can also be included that enable the shut-down of propellant flow, thereby stopping all thrust.

The control system also utilises an ignition system 354a-d for each thrust chamber 351a-d as described for propulsion system 100 to initiate combustion of propellants in each thrust chamber 351a-d individually. Each ignition system 354a-d can be reused multiple times, allowing for multiple restarts.

The foregoing description of the invention includes preferred forms thereof. Modifications may be made thereto without departing from the scope of the invention as defined by the accompanying claims.

The invention claimed is:

1. A viscous liquid monopropellant (VLM) mixture comprising:
 a. a carrier-fluid present in an amount ranging from about 5% to 80% by mass;
  wherein the carrier fluid is selected from one or more silicone fluids, and
 b. a solid fraction comprising from about 20% to 95% by mass dispersed, suspended or emulsified in the carrier-fluid;
  wherein the solid fraction comprises:
   (i). one or more primary oxidiser(s); and
   (ii). a thermic agent or combination of thermic agents present in an amount ranging from less than 1% to about 25% by mass of the VLM mixture;
    wherein the thermic agent(s) is/are selected from metals including aluminum, magnesium, boron, beryllium, silicon, zirconium, and alloys of these, either alone or in combination;
 c. a bonding agent or combination of bonding agents present in an amount ranging from less than 1% to about 10% by mass;
  wherein the bonding agent is selected from an amodimethicone of molecular weight no more than 5,000 g/mol$^{-1}$.

2. The VLM mixture of claim 1 wherein the carrier-fluid is in an amount ranging from about 15% to 65% by mass.

3. The VLM mixture of claim 2 wherein the carrier-fluid is in an amount ranging from about 20% to 40% by mass.

4. The VLM mixture of claim 1 wherein the solid fraction is present in amount ranging from about 35% to 85% by mass.

5. The VLM mixture of claim 4 wherein the solid fraction is present in an amount ranging from about 60% to 80% by mass.

6. The VLM mixture of claim 1 further comprising any combination of:
 a. a surfactant or combination of surfactants present in an amount ranging from less than 1% to about 20% by mass,
 b. a rheology modifier or combination of rheology modifiers present in an amount ranging from less than 1% to about 10% by mass,
 c. a burn rate modifier or combination of burn rate modifiers present in an amount ranging from less than 1% to about 10% by mass, or
 d. a dissolved gas within the carrier fluid to improve dispersion, atomisation and combustion present in an amount ranging from less than 1% to about 25% by mass.

7. The VLM mixture of claim 1, wherein the viscosity of the carrier-fluid is from about 50 centistokes to 50000 centistokes at STP.

8. The VLM mixture of claim 1, wherein the one or more primary oxidizer(s) is/are selected from ammonium perchlorate, ammonium nitrate, hydroxylamine nitrate, ammonium dinitramide, hydrazinium nitroformate and hydrogen peroxide.

9. The VLM mixture of claim 6 wherein the surfactant(s) is/are selected from agents including polysorbates, alkylphenylethoxylates, alcohol ethoxylates, soya lecithin or derivatives thereof, solutions of polycarboxylic acid salts of polyamine amides, acidic polyesters or polyethylene glycols (PEGs) of molecular weight no more than 5,000 g/mol$^{-1}$.

10. The VLM mixture of claim 6 wherein the rheology modifier(s) is/are selected from agents including castor oil derivatives, organoclay derivatives, modified urea and fumed silica.

11. The VLM mixture of claim 6 wherein the burn rate modifier(s) is/are selected from agents including iron (III) oxide ($Fe_2O_3$), copper (II) chromite ($2CuO.Cr_2O_3$), cupric oxide (CuO), chromium (III) oxide ($Cr_2O_3$), vanadium (V) pentoxide ($V_2O_5$), organometallic transition metal coordination complexes, cyclopentadienyl ring system complexes and/or isoelectronic (cf. cyclopentadienyl) ring system complexes.

12. The VLM mixture of claim 1 comprising 28.4% by mass polydimethylsiloxane, 0.6% by mass castor oil derivative, 1% by mass Amodimethicone, 10% by mass aluminium powder, and 60% by mass ammonium perchlorate.

13. A rocket propulsion system utilising the VLM mixture of claim 1 for the purposes of providing thrust to vehicles and comprising:
 a. a propellant tank for containing the VLM,
 b. a propellant feed system for transporting the VLM from the tank at suitable pressures and flow rates,
 c. a combustion chamber for receiving the VLM from the tank and burning it to generate combustion by-products,
 d. an injector system at one end of the combustion chamber, for injecting and finely dispersing or atomising the VLM into the combustion chamber in order to maximise the available surface area for combustion,
 e. an ignition system to initiate the combustion of the VLM within the combustion chamber, and
 f. a nozzle at another end of the combustion chamber for the acceleration and exit of the combustion by-products thereby providing thrust.

14. A sub-orbital airborne missile utilising the propulsion system of claim 13 comprising:
 a. a body for housing the propulsion system, and
 b. a control system for controlling the operation of the propulsion system.

15. A missile as in claim 14 wherein the control system comprises one or more thrust chambers spaced around the body for controlling the trajectory/attitude of the missile.

16. An orbital launch vehicle comprising a body having two or more stages that are separable during flight, and wherein one or more of the stages utilise the propulsion system of claim 13 for primary thrust.

17. A spacecraft utilising the propulsion system of claim 13 comprising:
 a. a body coupled to the propulsion system, and wherein the propulsion system comprises one or more thrust chambers radially spaced around the body the for attitude control/manoeuvring of the spacecraft, and
 b. a control system for controlling the operation of the propulsion system.

18. A spacecraft as in claim 17 wherein each thrust chamber is associated with separate feed and ignition systems and all thrust chambers are associated with the same propellant tank.

* * * * *